United States Patent
Lee et al.

(10) Patent No.: US 8,774,064 B2
(45) Date of Patent: Jul. 8, 2014

(54) METHOD AND APPARATUS OF UPLINK TRANSMISSION IN WIRELESS COMMUNICATION SYSTEM

(75) Inventors: Jae Wook Lee, Anyang-si (KR); Sung Jun Park, Anyang-si (KR); Sung Hoon Jung, Anyang-si (KR); Young Dae Lee, Anyang-si (KR); Seung June Yi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 266 days.

(21) Appl. No.: 13/115,761

(22) Filed: May 25, 2011

(65) Prior Publication Data

US 2012/0172063 A1 Jul. 5, 2012

(30) Foreign Application Priority Data

Jan. 4, 2011 (KR) .................... 10-2011-0000684

(51) Int. Cl.
*H04L 5/14* (2006.01)
(52) U.S. Cl.
USPC ............ 370/276; 370/230; 370/235; 370/342

(58) Field of Classification Search
USPC .......................................................... 370/342
See application file for complete search history.

(56) References Cited

U.S. PATENT DOCUMENTS

| | | | |
|---|---|---|---|
| 2009/0213818 A1* | 8/2009 | Park et al. | 370/336 |
| 2010/0195522 A1* | 8/2010 | Lee et al. | 370/252 |
| 2010/0316021 A1* | 12/2010 | Lerzer et al. | 370/331 |
| 2011/0249641 A1* | 10/2011 | Kwon et al. | 370/329 |
| 2011/0268085 A1* | 11/2011 | Barany et al. | 370/331 |
| 2012/0044812 A1* | 2/2012 | Hiddink et al. | 370/241 |

* cited by examiner

*Primary Examiner* — Jae Y Lee
*Assistant Examiner* — Abu-Sayeed Haque
(74) *Attorney, Agent, or Firm* — Birch, Stewart, Kolasch & Birch, LLP

(57) ABSTRACT

The present invention provides a method of receiving a message by a terminal in a wireless communication system. The method includes receiving a message from a base station, and determining whether to initiate a random access procedure based on the presence of an indicator in the message, wherein the indicator is used for an uplink transmission.

7 Claims, 10 Drawing Sheets

METHOD AND APPARATUS OF UPLINK TRANSMISSION IN WIRELESS COMMUNICATION SYSTEM

CROSS-REFERENCE TO RELATED APPLICATIONS

This application claims the benefit of priority of Korean Patent application No. 10-2011-0000684 filed on Jan. 4, 2011, all of which are incorporated by reference in their entirety herein.

BACKGROUND OF THE INVENTION

1. Field of the Invention

The present invention relates to wireless communication. More specifically, the present invention relates to an uplink transmission method and an uplink transmission apparatus in a wireless communication system.

2. Related Art

The 3GPP (3rd Generation Partnership Project) LTE (Long Term Evolution), which is an advanced version of the universal mobile telecommunications system (UMTS), has been introduced to the public as the 3GPP release 8. The 3GPP LTE uses orthogonal frequency division multiple access (OFDMA) for downlink transmission and uses single carrier-frequency division multiple access (SC-FDMA) for uplink transmission. The 3GPP LTE employs multiple input multiple output (MIMO) scheme, comprising four antennas at maximum. Recently, the 3GPP LTE-A (LTE-Advanced), which is a more advanced version of the 3GPP LTE, is under discussion.

Recently, actively employed are machine type communication (MTC) systems, handling communication among machines without human interaction. Services provided through the MTC systems are distinguishable from the services of the traditional communication involving human interaction. There are various categories of MTC services. For example, tracking, metering, monitoring, payment, medical services, remote operation services, and so on can be provided by MTC systems. A common environment for the operation of MTC devices can be postulated as follows: an MTC device used for MTC function is equipped with limited mobility; a plurality of MTC devices belong to a single cell; and according to the characteristics of the MTC devices, a plurality of MTC devices attempt to transmit data in uplink almost at the same time. As described above, a method of uplink transmission and an apparatus supporting the method in the environment where a plurality of terminals attempt to transmit data at the same time should be taken into consideration.

SUMMARY OF THE INVENTION

The present invention provides a method and apparatus of uplink transmission of a wireless.

In an aspect, a method of receiving a message by a terminal in a wireless communication system includes receiving a message from a base station, and determining whether to initiate a random access procedure based on the presence of an indicator in the message, wherein the indicator is used for an uplink transmission.

The method may further include discarding data stored in the terminal for the uplink transmission or data generated for the uplink transmission when the terminal determines not to initiate the random access procedure.

The terminal may determine to initiates the random access procedure, if the indicator is not included in the message.

The method may further include initiating a random access procedure for uplink transmission and transmitting uplink data to the base station, when the terminal determines to initiates the random access procedure.

The random access procedure may include transmitting a random access preamble to the base station, and receiving a random access response from the base station in response to the random access preamble.

The message includes an identifier of the terminal or a group identifier of the terminal.

The message may be a paging message or system information.

The terminal may receive the message in RRC_IDLE state.

The message may be transmitted on PDCCH

The indicator may be a stop indicator in order to stop the uplink transmission.

The stop indicator may be for delay tolerant data of the uplink transmission.

DESCRIPTION OF EXEMPLARY EMBODIMENTS

Figure 1:
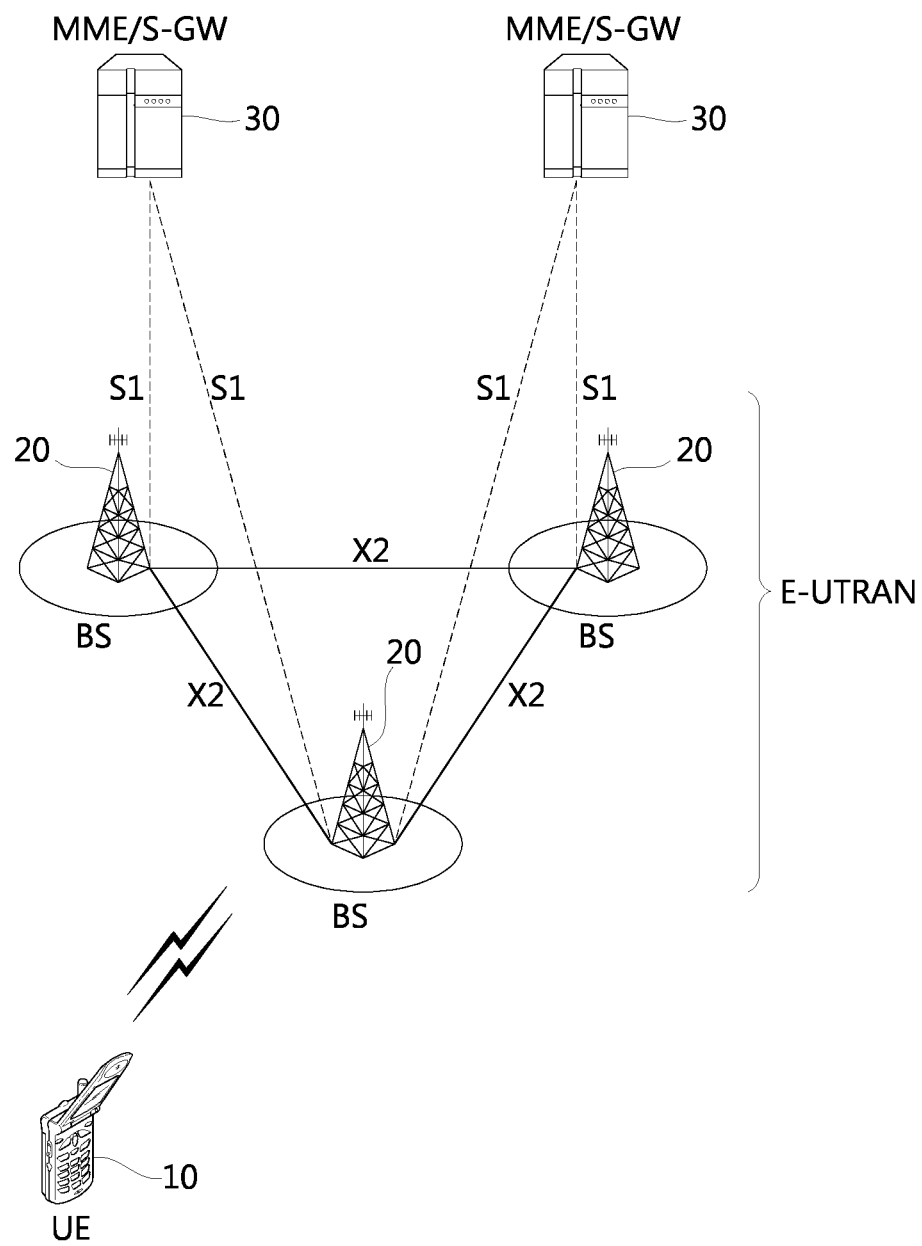
FIG. 1 illustrates one example of a wireless communication system to which the present invention can be applied.

FIG. 1 illustrates one example of a wireless communication system to which the present invention can be applied. The present invention can be applied to the E-UTRAN (Evolved-UMTS Terrestrial Radio Access Network) and the LTE (Long Term Evolution)/LTE-A system.

The LTE system is a mobile communication system evolved from the UMTS system; standardization of the LTE system is in progress in the international standards developing organization of 3GPP (3rd Generation Partnership Project).

The E-UTRAN comprises a base station (BS) 20 communicating with an user equipment (UE) 10 through a control plane and a user plane. The user equipment is either stationary or mobile; and can also be called an MS (Mobile Station), an UT (User Terminal), an SS (Subscriber Station), an MT (Mobile Terminal), or a wireless device. The base station 20 refers to a fixed station communicating with the user equipment and can also be called an eNB (evolved-NodeB), a BTS (Base Transceiver System), or an access point.

Base stations can be connected to each other through an X2 interface. The base station 20 is connected to other entities through an S1 interface, more specifically, to an MME (Mobility Management Entity) through an S1-MME and to an S-GW (Serving Gateway) through an S1-U.

An EPC 30 comprises an MME, an S-GW, and a P-GW (Packet Data Network-Gateway). The MME stores connection information of a terminal or information about capabilities of the terminal; the information is mainly used for managing mobility of the terminal. The S-GW is a gateway for the E-UTRAN as an endpoint; the P-GW is a gateway for a PDN (Packet Data Network) as an endpoint.

Figure 2:
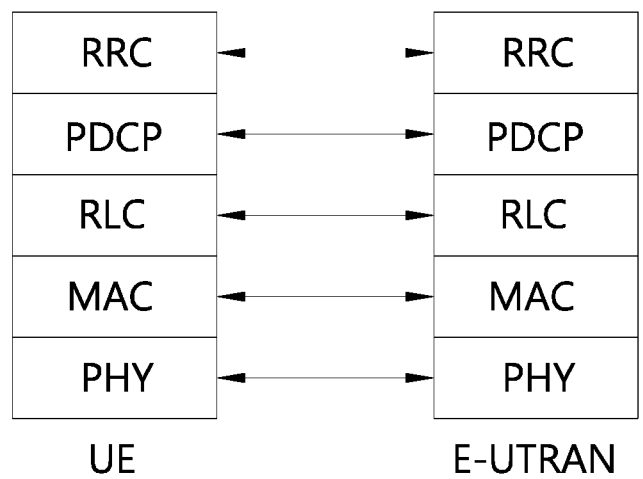
FIGS. 2 and 3 are a simplified control plane and a simplified user plane of an LTE system respectively.
Figure 3:
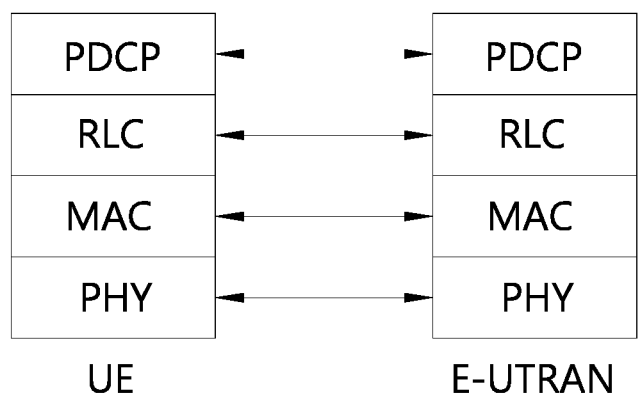

A Uu interface, which is a radio interface, defines a wireless (radio) interface protocol, comprising a physical layer, a data link layer, and a network layer in the horizontal hierarchy, while comprising an user plane (U-plane) for transmitting user data and a control plane (C-plane) for control signals in the vertical hierarchy. As shown in FIGS. 2 and 3, the wireless (radio) interface protocol can be divided into three layers based on the lower three layers of the Open System Interconnection (OSI) reference model well-known for the general communication systems, comprising L1 (a first layer) including a physical layer (PHY); L2 (a second layer) including the MAC, RLC, and PDCP; and L3 (a third layer) including the RRC layer. The layers are provided in pairs in the UE and the E-UTRAN for data transmission through the Uu interface.

FIGS. 2 and 3 are a simplified control plane and a simplified user plane of an LTE system respectively.

The physical layer (PHY), which is a first layer, provides an information transfer service to an upper layer through a physical channel. The PHY layer is connected to a Medium Access Control (MAC) layer, which is an upper layer of the PHY layer, and data can transfer between the MAC layer and the PHY layer through a transport channel. At this time, the transport channel is generally classified into a dedicated transport channel and a common transport channel depending on whether the transport channel is shared or not. Data transmission between different PHY layers, namely, between a PHY layer of the receiving side and a PHY layer of the transmitting side is provided through a physical channel using radio resources.

The second layer comprises various layers. First, the Medium Access Control (MAC) layer maps a plurality of logical channels to various transport channels and also performs logical channel multiplexing, which maps a plurality of logical channels to one transport channel. The MAC layer is connected to the RLC layer, which is an upper layer of the MAC layer, through a logical channel. Depending on what type of information transferred, the logical channel is generally classified into a control channel which carries control plane information and a traffic channel which carries user plane information.

The Radio Link Control (RLC) layer of the second layer performs segmentation and concatenation for the data received from an upper layer to transmit the data with an appropriate size by a lower layer through a radio interface. Also, the RLC layer provides three operation modes to guarantee various QoS requirements for the respective radio bearers (RBsk): TM (Transparent Mode), UM (Un-acknowledged Mode), and AM (Acknowledged Mode). In particular, the AM of the RLC layer performs a re-transmission function by using an automatic repeat and request (ARQ) scheme to ensure reliable data transmission.

The Packet Data Convergence Protocol (PDCP) layer of the second layer performs a header compression function, which reduces the size of the IP packet header containing unnecessary control information with a relatively large size, to transmit the IP packets such as IPv4 and IPv6 packets efficiently through a radio interface having a narrow bandwidth. The header compression function improves the transmission rate in a radio interface by allowing only the necessary information from among the header part of the data to be transmitted. Also, in the LTE system, the PDCP layer also performs a security function, which is ciphering that prevents data monitoring by a third party and integrity protection that prevents data manipulation by a third party.

The Radio Resource Control (RRC) layer located at the lowest of the third layer is only defined in the control plane, controlling logical channels, transport channels, and physical channels related to the configuration, re-configuration, and release of Radio Bearers (RBs). At this point, the RB signifies a logical path for data transmission between the terminal and the UTRAN, provided by the first layer and the second layer of the radio interface protocol. In general, configuration of the RB represents a process of defining radio interface protocol layers and characteristics of associated channels required for providing particular services; and setting up specific parameters and operating methods. The RB can be divided into two RBs: SRB (Signaling RB) and DRB (Data RB). The SRB is used as a path for transmitting RRC messages in the C-plane, while the DRB for transmitting user data in the U-plane.

Downlink channels transmitting data from a network to a terminal include BCH (Broadcast Channel) for transmitting system information and a downlink SCH (Shared Channel) for transmitting user traffic or control messages. Downlink traffic of multicast or broadcast services, or control messages can be transmitted through the downlink SCH or through a specific downlink MCH (Multicast Channel). Meanwhile, uplink channels transmitting data from the terminal to the network include RACH (Random Access Channel) for transmitting initial control messages and an uplink SCH (Shared Channel) for transmitting user traffic and control messages.

Logical channels located above the transport channels and mapped to the transport channels include a BCCH (Broadcast Control Channel), a PCCH (Paging Control Channel), a CCCH (Common Control Channel), an MCCH (Multicast Control Channel), and an MTCH (Multicast Traffic Channel).

A physical channel defines a plurality of sub-frames on the time axis and a plurality of sub-carriers on the frequency axis. At this point, one sub-frame comprises a plurality of symbols on the time axis. One sub-frame is related to a plurality of resource blocks; one resource block comprises a plurality of symbols and a plurality of sub-carriers. In addition, each sub-frame can use particular sub-carriers of particular symbols (for example, a first symbol) of the corresponding sub-frame for a PDCCH (Physical Downlink Control Channel) which is a L1/L2 control channel. One sub-frame has 0.5 ms and the TTI (Transmission Time Interval), which is the time unit for transmitting data, is 1 ms corresponding to two sub-frames.

In what follows, the RRC state of a terminal and a connection method in the RRC state are described. The RRC state defines whether the RRC layer of a terminal is logically connected to the RRC layer of the E-UTRAN. If they're connected to each other, it is called an RRC_CONNECTED state, while it is called an RRC_IDLE state if they are not connected to each other. If a terminal is in the RRC_CONNECTED state, the E-UTRAN can know the existence of the terminal in units of a cell since RRC connection is already established; therefore, the terminal can be controlled effectively. On the other hand, if a terminal is in the RRC_IDLE state, the E-UTRAN cannot know the existence of the terminal; the terminal is managed, by core network, in units of a tracking area which is larger than the cell. In other words, the terminal in the RRC_IDLE state can be detected only in the scale larger than the cell; therefore, in order for the terminal to receive ordinary mobile communication services such as voice or data service, the terminal should make transition to the RRC_CONNECTED state. Each TA is identified by TAI (Tracking area identity). A terminal can set up the TAI through TAC (Tracking Area Code) which is the information broadcast from the cell.

When the user turns on the power of a terminal, the terminal first searches for an appropriate cell, establishes RRC connection in the appropriate cell, and registers terminal information in the core network. Afterwards, the terminal stays in the RRC_IDLE state. The terminal staying in the RRC_IDEL state, (re)selects the cell depending on the needs and monitors system information or paging information. The above process is called camp-on-a-cell. The terminal in the RRC_IDLE state does not make transition to the RRC_CONNECTED until the terminal needs to establish RRC connection; the terminal performs an RRC connection establishment procedure to establish the RRC connection to the RRC layer of the E-UTRAN, making transition to the RRC_CONNECTED state. There are various causes for the terminal in the RRC_IDLE state to establish RRC connection; for example, a need for uplink data transmission from the user's attempt for a phone call or a need to transmit a message responding to a paging message received.

In what follows, a paging procedure and the operation of the terminal when the corresponding message is received are described. Paging is used when the core network transmits paging information to a terminal in the RRC_IDLE state; when system information change is informed; and when urgent information should be transmitted. In addition, paging is used when a base station informs the terminal in the RRC_CONNECTED state of the change of the system information.

As described above, since the core network has the location information of the terminal in the RRC_IDLE state in units of TA, the core network does not know the cell in which the terminal stays. Because of the above, the core network transmits a paging message to all the base stations included in the TA list; the base stations receiving the paging message broadcast the corresponding paging message within their cells. At this time, the base stations broadcast the paging message on a PO (Paging Occasion). The PO is a sub-frame providing information about the transmission of the paging message and is calculated based on the ID of the terminal. The terminal in the RRC_IDLE state calculates the PO based on its own ID and reads the corresponding sub-frame. The terminal receives a paging message based on the information about reception of the paging message transmitted through the corresponding sub-frame and determines whether the ID of the terminal is included in the paging message. If the ID of the terminal is included in the message, the terminal establishes RRC connection, receives system information, or reads urgent information. If the ID of the terminal is not included in the received paging message, the terminal discards the received paging message.

Next, description of system information is provided. The system information includes necessary information that a terminal should know to make connection to a base station. Therefore, the terminal should have received all the system information before making connection to the base station and should maintain up-to-date system information all the time. Since all the terminals belonging to the same cell should know the system information, the base station periodically transmits the system information.

The system information is divided into an MIB (Master Information Block), an SB (Scheduling Block), and an SIB (System Information Block). The MIB allows the terminal to figure out the physical configuration of the corresponding cell, for example, a bandwidth. The SB informs transmission information of SIBs, for example, a transmission period. The SIB is a set of a same kind of system information. For example, one SIB includes information of neighbouring cells only, while another SIB includes only uplink channel information used for the terminal.

In what follows, description of (re)selection of a cell is provided. If power is on in the terminal, the terminal carries out a preparation procedure for receiving services by selecting the cell having an appropriate quality. The terminal in the RRC_IDLE state should always select the cell having an appropriate quality and be prepared for receiving services through the cell. For example, a terminal which has just been turned on should select a cell having an appropriate quality to register to a network. If the terminal in the RRC_CONNECTED state enters the RRC_IDLE state, the terminal should select a cell in which the terminal stays in the RRC_IDLE state. As described above, a process of selecting a cell satisfying certain conditions for a terminal to stay in the cell while the terminal is in a state waiting for a service such as the RRC_IDLE state is called cell selection. Since the cell selection is carried out while the cell in which the terminal is supposed to stay in the RRC_IDLE state is not determined, selecting a cell as quickly as possible is most important. Therefore, if a cell provides radio signals with a certain quality higher than a predetermined level, the cell can be selected during the cell selection procedure even if the cell may not provide radio signals with the highest quality to the terminal.

If the terminal selects a cell satisfying the cell selection criteria, the terminal receives, from the system information of the cell, information required for the operation of the terminal of the RRC_IDLE state in the cell. In other words, the terminal receives information required for the RRC_IDLE mode operation. After receiving information required for the RRC_IDLE mode operation, the terminal either requests a service to the network (e.g., Originating Call) or waits in the idle mode to receive a service (e.g., Terminating Call) from the network.

After the terminal selects a certain cell through the cell selection procedure, signal strength or signal quality between the terminal and the base station can be changed due to the mobility of the terminal or due to the change of the radio environment. Therefore, if the quality of the selected cell is degraded, the terminal can select a different cell providing better quality. If the cell selection procedure is performed again, a cell with a better signal quality than the currently selected cell is usually selected. The above procedure is called cell reselection. The cell reselection procedure is intended primarily to provide the terminal with an opportunity to select the best cell in terms of the quality of radio signals. Besides the quality of radio signals, the network can determine the priority of the frequencies and inform the terminal of the determined priority of the frequencies. The terminal which has received the priority of the frequencies takes account of this priority with a higher priority than the radio signal quality criteria during the cell reselection procedure.

In what follows, a random access (hereinafter abbreviated RA) procedure is described.

The RA procedure defined by the LTE system comprises a contention based random access procedure and a non-contention based random access procedure. Classification between the contention based random access procedure and the non-contention based random access procedure depends on whether the random access preamble used for the random access procedure is selected by the terminal or the base station.

In the non-contention based random access procedure, the terminal uses the random access preamble assigned by the base station. Therefore, if the base station assigns the particular random access preamble to that terminal only, the random access preamble is assigned only to that terminal, while the preamble is not used for the other terminals. Therefore, since the random access preamble and the terminal using the random access preamble holds one-to-one correspondence, there is no collision between the terminal and the other terminals. Therefore, in this case, it can be regarded effective since the base station can identify the terminal which has transmitted the random access preamble immediately after the random access preamble is received.

On the other hand, since the contention-based random access procedure selects an arbitrary one among the random access preambles which can be used for the terminal and transmits the selected preamble, chances are that a plurality of terminals uses the same random access preamble. Therefore, even if the base station receives a particular random access preamble, it is not possible to know which terminal has transmitted the particular random access preamble.

The terminal carries out the random access procedure in the following cases: when the terminal attempts initial access because the RRC connection between the terminal and the base station has not been established; when the terminal makes an access to a target cell for the first time during a handover procedure; when the random access procedure is requested by a command from the base station; when uplink data exist while the terminal fails to synchronize in uplink or the radio resources used for requesting radio resources are not assigned; and when a recovery process is needed due to a radio link failure or a handover failure.

Figure 4:
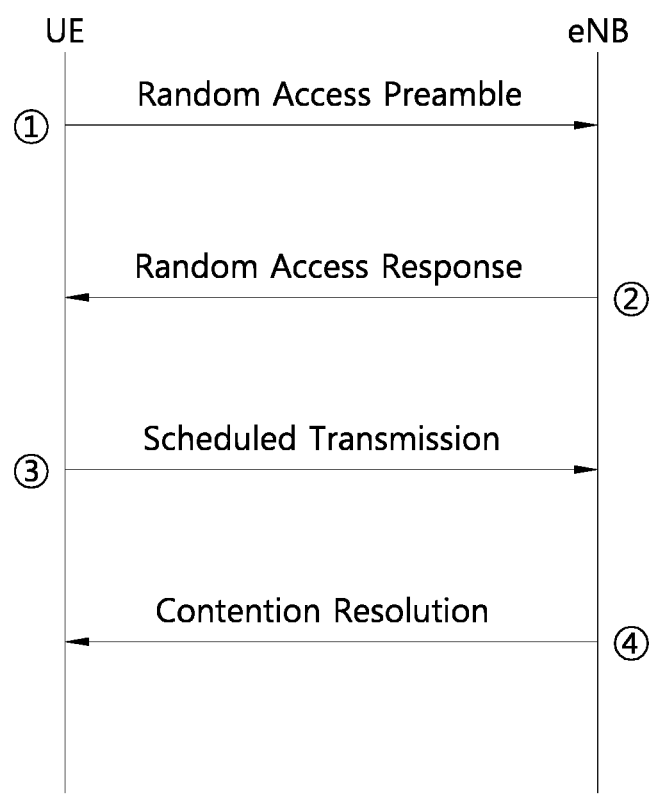
FIG. 4 illustrates one example of a random access procedure.

FIG. 4 illustrates an operation between a terminal and a base station during the contention-based random access procedure.

In the contention-based random access procedure, the terminal randomly selects one random access preamble from among the set of random access preambles specified through the system information or a handover command; selects PRACH resources able to transmit the random access preamble; and transmits the selected random access preamble through PRACH resources. The transmitted preamble at this time is called RACH MSG 1.

The terminal, after transmitting the random access preamble as described above, monitors to receive a random access response within a random access response reception window indicated by the base station through the system information or the handover command. To be more specific, the random access response information (usually, it is called RACH MSG 2) is transmitted in the form of MAC PDU and the MAC PDU is transmitted to PDSCH. Also, PDCCH is transmitted together for the terminal to properly receive the information carried by the PDSCH. In other words, the PDCCH comprises the information of a terminal which should receive the PDSCH; the frequency and time information of the radio resources of the PDSCH; and the transmission format of the PDSCH. Once the terminal succeeds in receiving PDCCH, the terminal properly receives the random access response transmitted through the PDSCH according to the information of the PDCCH. The random access response comprises a random access preamble identifier (ID), an uplink grant for radio resources (UL Grant), a temporary cell identifier (C-RNTI), and a time advance command. The random access preamble identifier is required since one random access response message can include more than one random access response for more than one terminal; accordingly, it is necessary to know to that the UL Grant, the temporary cell identifier, and the time advance command are for which terminal. The random access preamble identifier corresponds to the random access preamble selected in the procedure no. 1 of FIG. 4.

If the terminal receives a valid random access response, the terminal processes the information included in the random access response. In other words, the terminal applies the time advance command and stores the temporary cell identifier. Also, the terminal, by using the uplink radio resources, transmits data stored in the buffer of the terminal or newly generated data to the base station. At this time, the data transmitted through the uplink radio resources, namely, the MAC PDU is commonly called RACH MSG 3. The data included in the uplink radio resources (hereinafter, it is also called message 3) should include an identifier for the terminal. This is because there is no other way in the contention-based random access procedure to figure out which terminals perform the random access procedure and the individual terminals should be distinguished from each other to avoid collision among them later.

Two methods are used for including the identifier of the terminal in the message 3. In a first method, if the terminal already has a valid cell identifier assigned by the corresponding cell before the random access procedure, the terminal transmits the cell identifier using the UL Grant. On the other hand, if a valid cell identifier is not assigned to the terminal before the random access procedure, the terminal includes its unique identifier (for example, S-TMSI or random ID) and transmits the unique identifier. In general, the unique identifier is longer than the cell identifier. The terminal, after transmitting the data through the uplink radio resources, starts a contention resolution timer.

The terminal, after transmitting data including its own identifier through uplink radio resources, waits for a command from the base station to resolve contention. In other words, the terminal monitors a PDCCH to receive a particular message. There are also two methods of monitoring the PDCCH. As mentioned earlier, if the identifier of the terminal transmitted through the uplink wireless resources corresponds to a cell identifier, the terminal monitors the PDCCH by using the cell identifier, while if the identifier is a unique identifier, the terminal monitors the PDCCH by using a temporary cell identifier included in the random access response. Next, in the former case, if a message (hereinafter, it is called a message 4) is received on the PDCCH through the cell identifier of the terminal before the contention resolution timer is expired, the terminal determines that the random access procedure has been carried out successfully and terminates the random access procedure. In the latter case, if the PDCCH has been monitored through the temporary cell identifier before the contention resolution timer is expired, data (hereinafter, it is called a message 4) transmitted on the PDSCH indicated by the PDCCH is checked. If a unique identifier of the terminal is included in the data, the terminal determines that the random access procedure has been carried out successfully and terminates the random access procedure. The message or the MAC PDU received at the fourth step is commonly called the RACH MSG 4.

Figure 5:
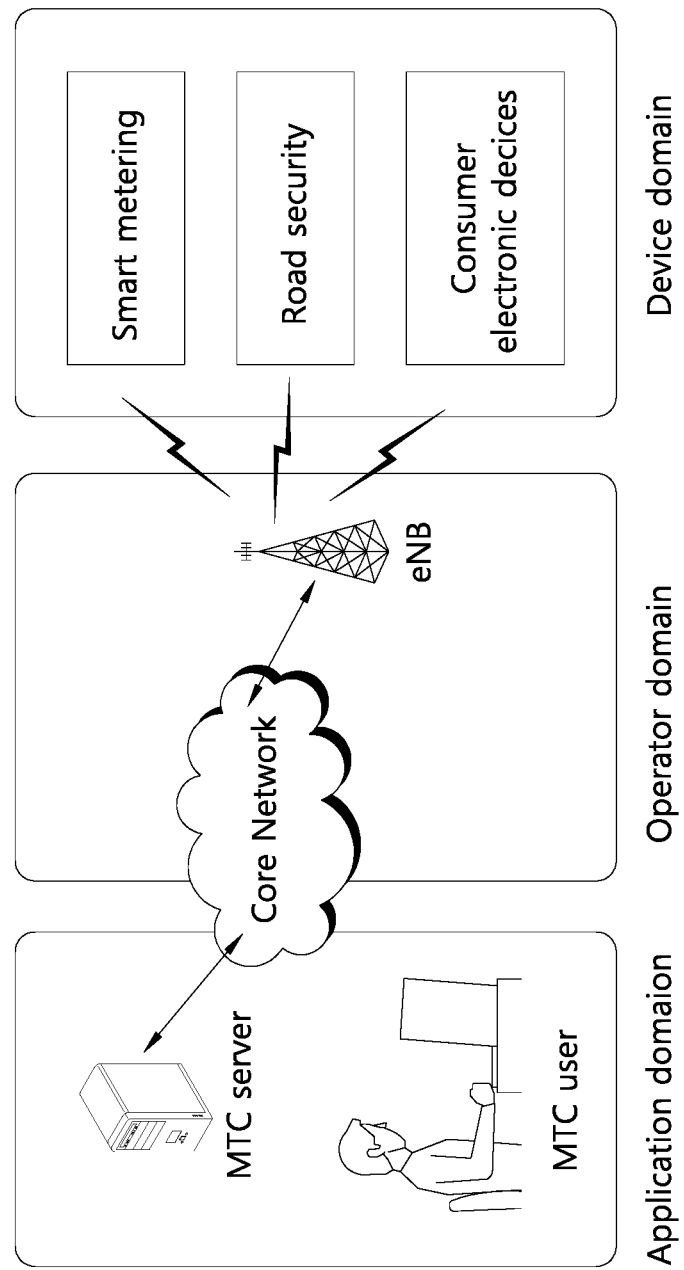
FIG. 5 illustrates the overall structure of an MTC system to which the present invention can be applied.

FIG. 5 illustrates the overall structure of an MTC system to which the present invention can be applied.

The MTC device communicates with other MTC devices or an MTC server through a mobile communication network (PLMN). The MTC server, as shown in FIG. 5, can provide the MTC user with metering, road security, adjustment of consumer electronic devices, and so on, which are the services provided through the MTC device.

In supporting the MTC service efficiently, characteristics of the MTC device such as low mobility, time tolerance, small data transmission, and so on can be taken into account. Also, it can be assumed that a plurality of MTC devices can exist in a single cell.

It is common that many MTC devices used for MTC services such as sensing and monitoring are installed in a small area. In this case, it is quite possible that similar information is generated at the same time by the MTC devices, and the MTC devices, to transmit the information to the base station, attempt an RA procedure to establish the RRC connection to the base station simultaneously. At this time, a terminal which has started the RA procedure, repeats the RA procedure until the RRC connection is successfully established or until the maximum number of attempts for the RA procedure is reached. There is a high chance that the wireless network can be congested due to the above.

Therefore, the present invention provides a method of restricting the terminal's attempt to perform the RA procedure in view of the network comprises the base station's transmitting an indicator about whether to restrict the attempt to perform the RA procedure base on the needs of the base station; the terminal which receives the indicator checking whether the base station allows the terminal(s) to attempt to perform the RA procedure; if it is found that the RA procedure is allowed, attempting the RA procedure and if not, stopping all the attempts to perform the RA procedure and on-going RA procedures.

To describe the above in view of the terminal, if there are data to be transmitted to the base station, the terminal first receives an indicator about whether the RA procedure is restricted or not from the base station before attempting the RA procedure for transmitting the data. If the indicator received by the terminal allows data transmission through the RA procedure, the corresponding data are transmitted to the base station, while initiating the RA procedure may be delayed or abandoned if data transmission is not allowed. At this time, the terminal can discard the corresponding data supposed to be transmitted to the base station. The terminal can be an MTC device and the terminal can stay either in the RRC_IDLE state or in the RRC_CONNECTED state. The terminal in the RRC_IDLE state can perform the RA procedure to establish the RRC connection to the base station when data transmission and reception is required.

Figure 6:
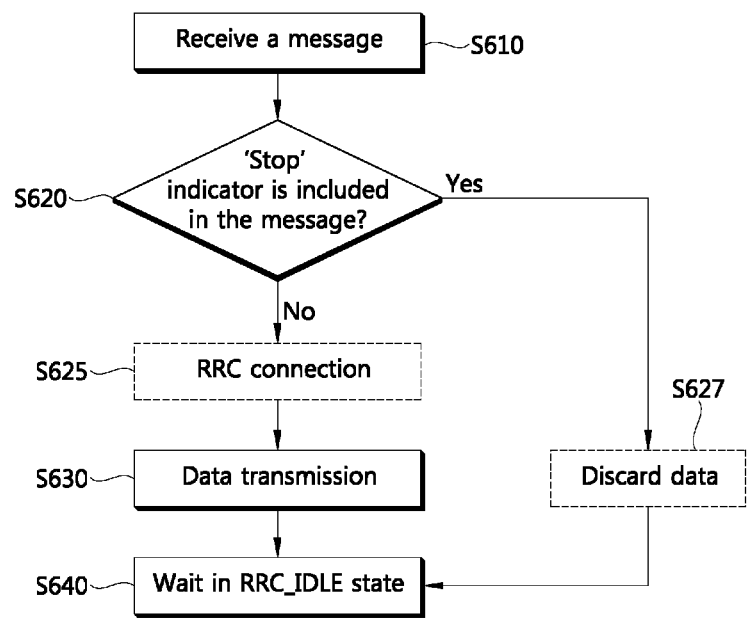
FIG. 6 is a flow diagram illustrating operation of a terminal according to one embodiment of the present invention.

FIG. 6 is a flow diagram illustrating operation of a terminal according to one embodiment of the present invention.

The terminal receives a message S610 and checks whether a 'stop' indicator is included in the received message S620. The message received by the terminal can be a paging message, system information, a MAC control element (CE) if the terminal operating in the RRC_CONNECTED state, an RA response message (□ of FIG. 4) in the RA procedure, or a message newly defined for transmitting an indicator indicating whether to allow uplink transmission for the terminal. When the terminal receives a message S610, whether the message is supposed to be transmitted to the terminal can be determined based on whether the ID of the terminal is included in the message.

At this time, the message including the indicator, transmitted by the base station, indicating whether to allow the transmission can be applied to a particular terminal or a plurality of terminals. The plurality of terminals can belong to the same particular group.

The group can be defined in terms of the function carried out by MTC devices, an application program, an installation area, the delay characteristic of generated data, and so on. In other words, the MTC devices belonging to the same group can share the same characteristic in terms of a function, an application program, or an area.

The individual group can have a group identity (ID) distinguishing the corresponding group from the others. The terminals belonging to the same group have the same group ID. The base station can incorporate the group ID into the transmitted message indicating whether to allow data transmission for a plurality of particular terminals at a time. The terminal can determine whether the message has been transmitted to itself by checking whether the group ID included in the message corresponds to the ID of the group to which the terminal belongs.

According to the above, the terminal can be an MTC device; and the terminal can be either in the RRC_CONNECTED state or in the RRC_IDLE state.

The terminal can know whether the attempt to carry out the RA procedure is allowed in the cell through the information (the indicator included in the message indicating whether the uplink transmission is allowed) transmitted from the base station. The terminal can receive the information transmitted from the base station through the RRC layer, the MAC layer, or the physical layer.

For example, when the terminal receives information about whether the RA procedure is allowed through the RRC layer, the base station can use a 'stop' indicator to indicate whether the base station allows the RA procedure. If the 'stop' indicator is included, uplink data transmission of the corresponding terminal is not allowed; if the 'stop' indicator is not included, the uplink data transmission of the corresponding terminal is allowed. The 'stop' indicator described above to indicate whether to allow the uplink data transmission is only one example of embodiments. Although the 'stop' indicator described above allows data transmission if not included; and the uplink data transmission is allowed if the 'stop' indicator is included, contrary to the above example, the indicator can take the form of allowing the uplink data transmission if it is included (e.g., 'approval' indicator). Also, the indicator can directly indicate the approval or disapproval. In what follows, for the convenience of description, the present invention is described with an example of using the 'stop' indicator, but the present invention is not limited to this example.

The 'stop' indicator can be transmitted in the form of indicating whether to allow the RRC connection for the uplink data transmission when the terminal operates in the RRC_IDLE state. At this time, if the 'stop' indicator is not included in the message, the RA procedure is attempted to establish the RRC connection of the terminal, while if the 'stop' indicator is included in the message, it indicates that the terminal is not allowed to attempt the RA procedure.

If the 'stop' indicator is included in the message, the RRC layer of the terminal stops all the attempts to perform the RA procedure of the MAC layer and on-going RA procedures. At this time, the stored data for transmission can be discarded S627. The terminal can wait in the RRC_IDLE state S640.

If the 'stop' indicator is not included in the message, the terminal operating in the RRC_IDLE state transmits uplink data after the RRC connection S625 is established S630. At this time, the RRC connection procedure S625 can be omitted for the terminal operating in the RRC_CONNECTED state. After the data transmission, the terminal can wait in the RRC_IDLE state S640.

In what follows, the operation of the base station and the terminal is described with a more specific example.

The terminal can receive the 'stop' indicator from the base station through a paging message. To this end, the base station can incorporate the 'stop' indicator into the paging message and transmit the paging message to the terminal.

The base station can incorporate the group ID into the paging message to apply the indicator to a plurality of terminals.

The terminal(s) which has checked that the ID of the terminal or the ID of the group to which the terminal belongs is included in the paging message can determine whether to attempt the RA procedure of the MAC layer depending on whether the 'stop' indicator is included in the paging message or not.

The terminal can receive the 'stop' indicator from the base station through the system information broadcast from a cell. To this end, the base station can broadcast the system information by incorporating the 'stop' indicator thereto. All the terminals in the cell where the indicator has been broadcast can determine whether to attempt the RA procedure of the MAC layer depending on whether the indicator is included in the system information.

The base station can incorporate the group ID into the system information message to apply the indicator to a plurality of particular terminals. The terminal(s) which has checked that the ID of the group to which the terminal(s) belong(s) is included in the system information can determine whether to attempt the RA procedure of the MAC layer depending on whether the indicator is included in the message.

An another example, if the terminal receives the permission for the RA procedure through the MAC layer, the terminal in the RRC_CONNECTED state can receive the 'stop' indictor from the base station through the MAC control element (CE). To this end, the base station can incorporate the indicator into the MAC CE and then transmit the MAC message.

The terminal which has received the MAC CE determines whether to attempt the RA procedure depending on whether the indicator is included in the message. If the indicator is included, the terminal stops a new attempt for the RA procedure and on-going RA procedures. If the indicator is not included, the terminal can attempt the RA procedure.

The terminal can receive a command indicating to stop the attempt for the RA procedure through the RA response message. To this end, the base station can define a new code point instructing to stop the transmission attempt of the terminal in the backoff indicator (BI) of the RA response message and use the newly defined code point.

The terminal which has received the RA response determines whether to attempt the RA procedure according to the code point value of the BI. If the code point value represents stoppage, the terminal stops a new attempt for the RA procedure and on-going RA procedures. If the code point represents a different value from the above value, the terminal can attempt the RA procedure after a predetermined time period specified by the BI.

As another example, if the terminal receives information about whether to allow the RA procedure through the physical layer, the terminal can receive a command instructing to stop the attempt for the RA procedure through the PDCCH from the base station.

To this end, the base station can define a new bit indicating stoppage of the attempt for the RA transmission through the physical channel (i.e. PDCCH) and transmit the newly defined bit. The terminal obtained information about whether to allow the attempt for the RA procedure through the PDCCH and determines whether to attempt the RA procedure. If information indicating disapproval of the attempt for the RA procedure is received through the PDCCH, the terminal stops a new attempt for the RA procedure and on-going RA procedures. If the information related to the RA transmission is not received, the terminal can attempt the RA procedure. At this time, the terminal can discard the stored data when the base station disapprove the RA procedure.

Figure 7A:
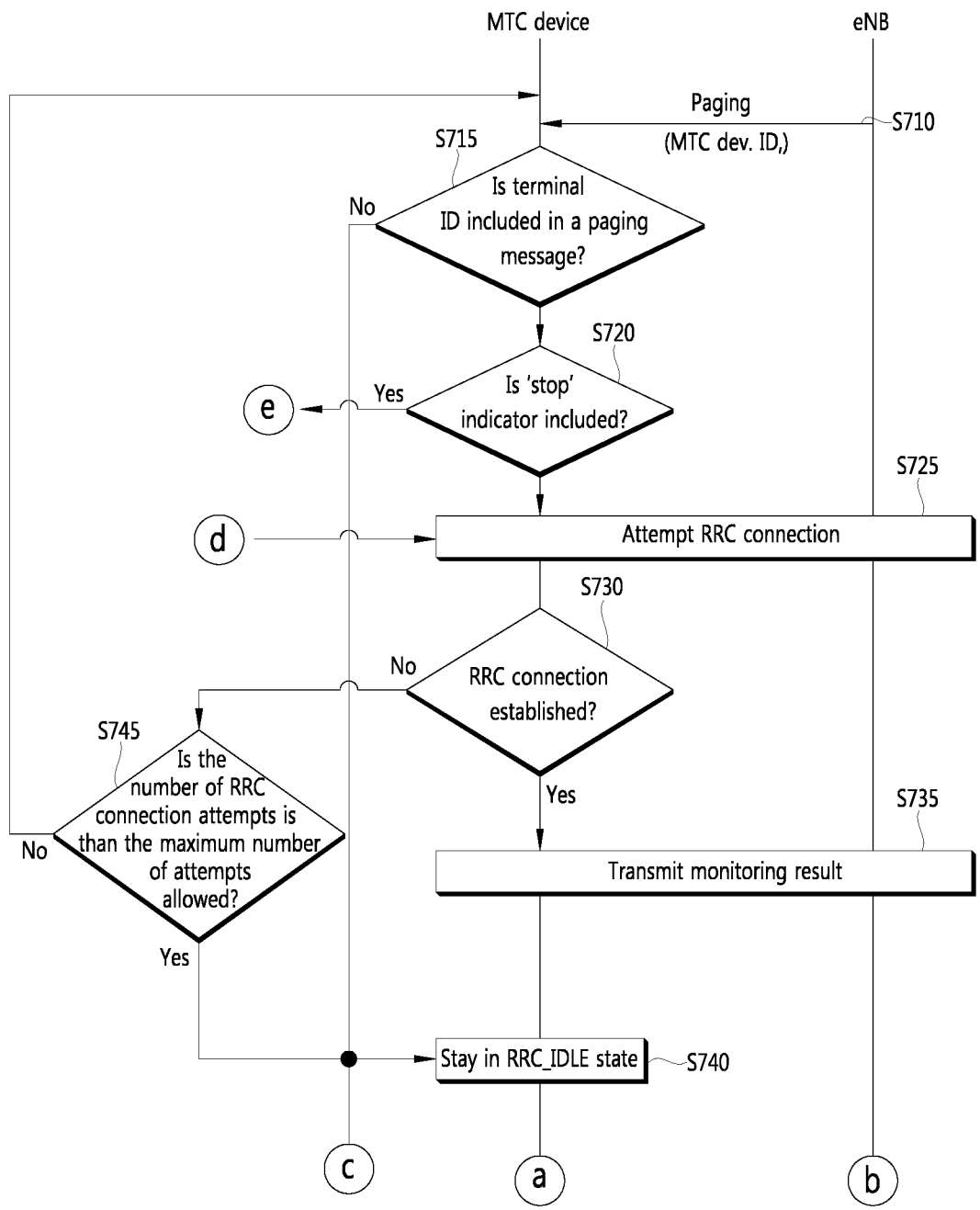
FIGS. 7 and 8 illustrate operation of using a 'stop' indicator between a base station and a terminal according to an embodiment of the present invention.
Figure 7B:
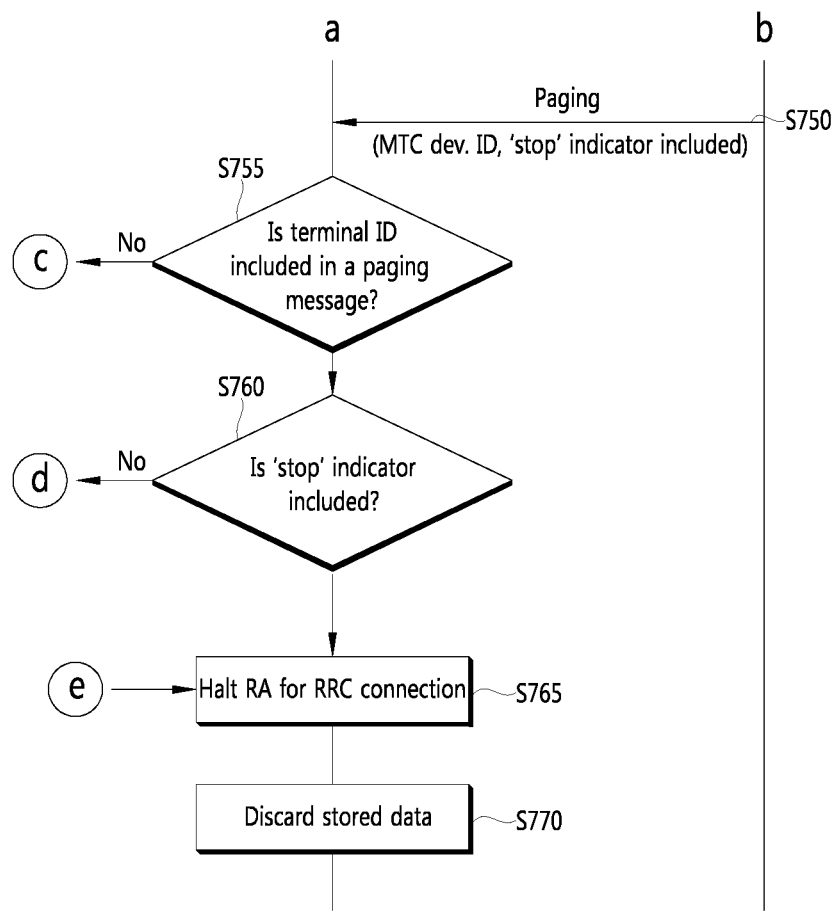
Figure 8:
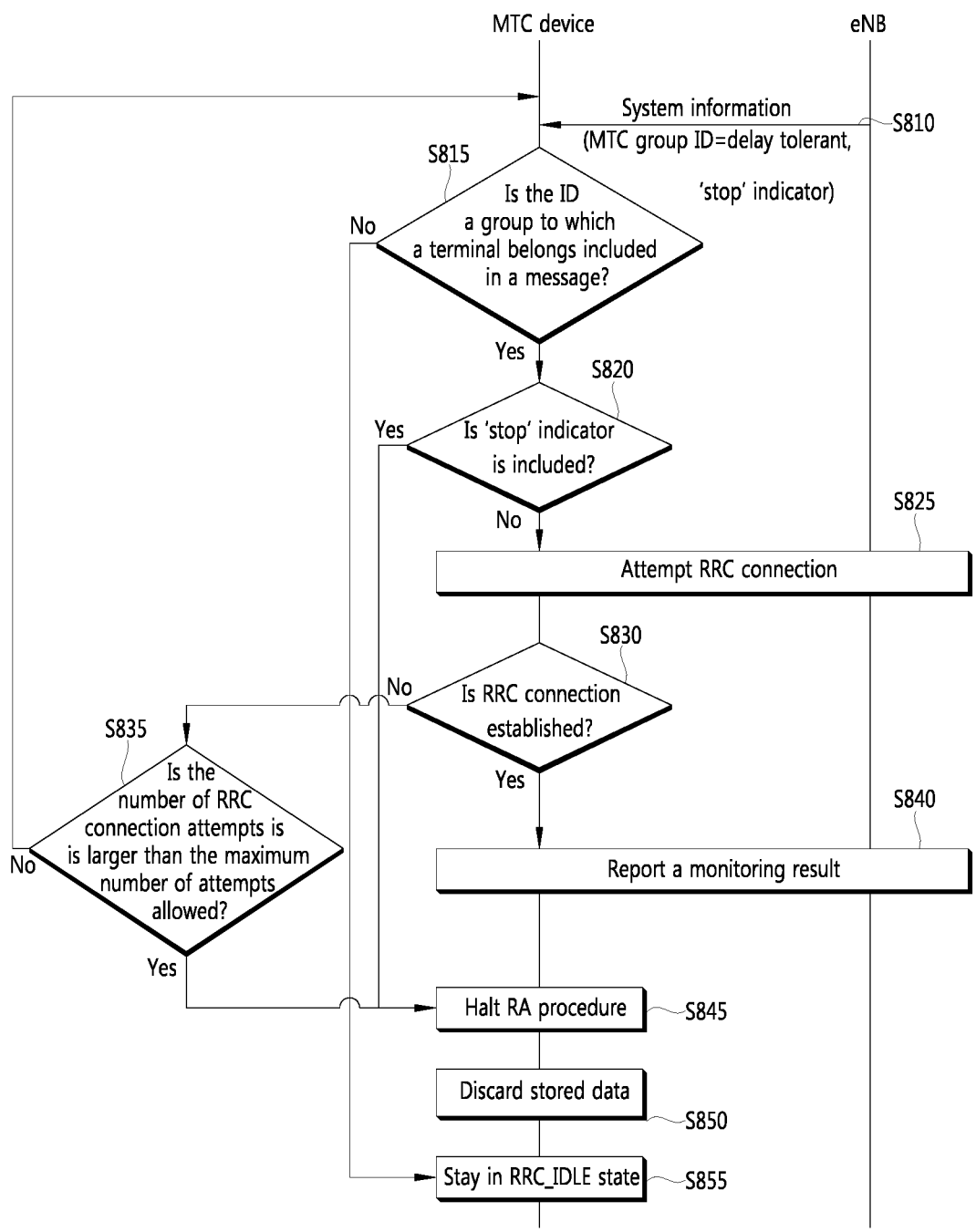

FIGS. 7 and 8 illustrate operation of using a 'stop' indicator between a base station and a terminal described above.

In FIG. 7, it is assumed that the terminal stays in the RRC_IDLE state and attempts the RA procedure to establish the RRC connection with the base station when a paging message is received. FIG. 7 illustrates the case where the terminal receives the 'stop' indicator through the paging message among various embodiments described above. Also, the terminal of FIG. 7 can be an MTC device installed for monitoring.

In the example of FIG. 7, if the 'stop' indicator is not included in the paging message, it implies that the attempt for the RRC connection of the terminal is allowed, while if the 'stop' indicator is included in the message, it implies that the attempt for the RRC connection of the terminal is disapproved.

The base station transmits the paging message to one or more terminals S710. At this time, it is assumed that the 'stop' indicator is not included in the paging message to indicate the approval of the RRC connection.

The terminal which has received the paging message checks whether the ID of the terminal is included in the paging message S715. If it is found that the ID is not included, the terminal still stays in the RRC_IDLE state. At this time, the ID included in the paging message can be the ID of the corresponding terminal of the paging message or the group ID indicating the group of the corresponding terminals of the paging message.

The terminal, if the ID of the terminal is included in the message, checks whether the 'stop' indicator, which is included in the paging message received, is included and based on the checking result, determines whether to establish the RRC connection S720.

The terminal, if it is checked that the paging message received does not include the 'stop' indicator, determines to establish the RRC connection and attempts the RRC connection S725.

The terminal checks whether the RRC connection is successful S730. If successful, the terminal transmits the monitoring result to the base station S735; if not, the terminal attempts again to establish the RRC connection.

The terminal which has transmitted the monitoring result to the base station can make a transition to the RRC_IDLE state and then wait S740.

If the RRC connection is checked S730 and it is found to have failed to establish the RRC connection S730, the terminal can repeat the RA procedure to establish the RRC connection for the maximum number of attempts S745. When the terminal attempts the RA procedure within the maximum number of attempts allowed, the terminal can receive a new paging message or changed system information; and carry out the remaining procedure based on the new paging message or the changed system information. In other words, whether the 'stop' indicator is included in the newly received paging message or the system information is checked again and the remaining procedure can be carried out. The newly received paging information or the system information may or may not include the 'stop' indicator; and can include the changed maximum number of attempts for the RA procedure. If the newly received paging message or the system information includes the changed information, the terminal can operate according to the changed information.

The base station, determining that a sufficient number of particular application data have been received, can inform the terminal(s) that data transmission is not needed through additional RRC connection. To this end, the base station incorporates the 'stop' indicator into the paging message and transmits the paging message to the terminal(s) S750.

The terminal which has received the paging message checks whether the ID of the terminal is included in the paging message S755. At this time, as in the S715 step, the ID of the terminal can be substituted with the group ID.

If the ID is included in the paging message, the terminal checks whether the 'stop' indicator is included in the paging message S760; and according to the checking result, the terminal checks whether additional RRC connection is needed.

The terminal checks whether the 'stop' indicator is included in the paging message and gets to know that additional RRC connection is not needed. The terminal, to establish the RRC connection, stops the attempt for the RA procedure S765.

The terminal which has stopped the RA procedure, if it has data stored for data transmission (e.g., a monitoring result), can discard the corresponding data S770.

FIG. 8 illustrates the case where the base station disapproves the cell connection of an MTC device generating delay tolerant data. FIG. 8 assumes that the terminal stays in the RRC_IDLE state and attempts the RA procedure to establish the RRC connection with the base station when data are generated. It is assumed that the terminal checks whether the 'stop' indicator is included in the system information and based on the checking result, attempts to establish the RRC connection. In FIG. 8, to prevent transmission of delay tolerant data, the base station includes the group ID of the terminals generating delay tolerant data into the system information and then transmits the system information.

The base station transmits the system information to the terminal S810. At this time, the system information includes the 'stop' indicator indicating whether to allow the RRC connection and the (group) ID indicating the corresponding terminal.

The terminal which has received the system information checks whether the group ID to which the terminal belongs is included in the message (system information) S815; if the group ID to which the terminal belongs is included in the system information, the terminal determines whether the 'stop' indicator is included S820; if the group ID to which the terminal belongs is not included in the system information, the terminal can wait in the RRC_IDLE state S855.

In the S820 step, if the 'stop' indicator is not included, the terminal attempts the RRC connection S825. On the other hand, if the 'stop' indicator is included in the system information, the terminal stops the RA procedure S845. When the terminal checks the 'stop' indicator and stops the RA procedure S845, the terminal can discard S850 the stored data (e.g., a monitoring result) and wait in the RRC_IDLE state S855.

After attempting the RRC connection S825, the terminal determines whether the RRC connection has been successful. If the RRC connection has been carried out successfully, the terminal can transmit the monitoring result to the base station S840. If it is found that the RRC connection is not successful in the S830 step, the terminal compares the maximum number of attempts allowed with the number of attempts for the RRC connection S835 and can attempt the RRC connection again.

Figure 9:
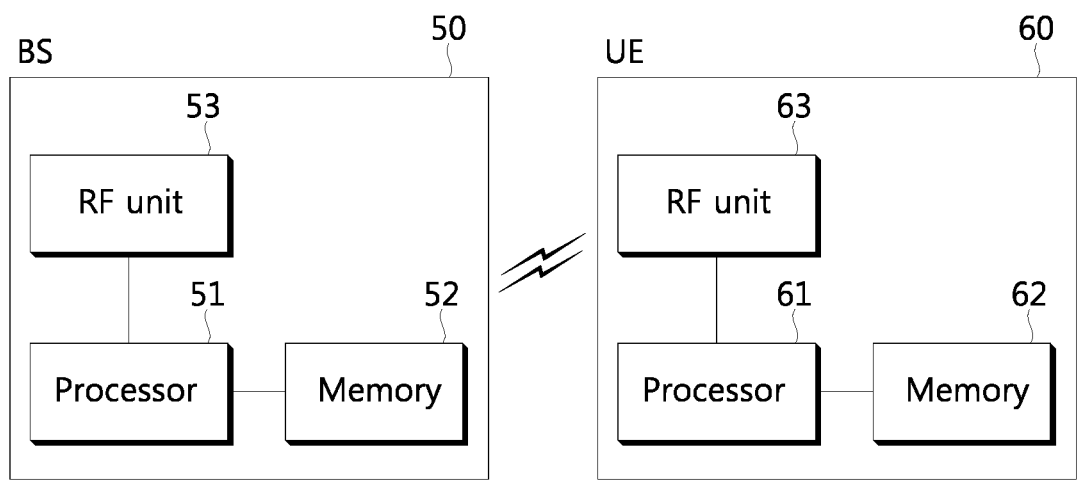
FIG. 9 is a block diagram illustrating a wireless communication system in which an embodiment of the present invention is implemented.

FIG. 9 is a block diagram illustrating a wireless communication system in which an embodiment of the present invention is implemented.

The base station 50 comprises a processor 51, a memory 52, and an RF unit 53. The memory 52 is connected to the processor 51 and thus stores a variety of information needed for driving the processor 51. The RF unit 53 is connected to the processor 51 and thus transmits and/or receives radio signals.

The processor 51 implements the proposed function, the proposed procedure, and/or the proposed method. The layers of the radio interface protocol can be implemented by the processor 51. The processor 51 can implement the operation of the base station described in FIGS. 6 to 8.

The terminal 60 comprises a processor 61, a memory 62, and an RF unit 63. The memory 62 is connected to the processor 61 and stores a variety of information needed for driving the processor 61. The RF unit 63 is connected to the processor 61 and thus transmits and/or receives radio signals.

The processor 61 implements the proposed function, the proposed procedure, and/or the proposed method. The layers of the radio interface protocol can be implemented by the processor 61. The processor 61 can implement the operation of the terminal described in the embodiments of FIGS. 6 to 8.

The processor can include ASIC (Application-Specific Integrated Circuit), other chipsets, logical circuits and/or data processing devices. The memory can include the ROM (Read-Only Memory), RAM (Random Access Memory), flash memory, a memory card, a storage medium and/or other storage devices. The RF unit can include a baseband circuit for processing radio signals. If the embodiments are implemented in software, the techniques described above can be implemented by the modules (procedures, functions, and so on) carrying out the functions described above. The modules are stored in the memory and can be carried out by the processor. The memory can be installed in the inside or outside of the processor and can be connected to the processor by making use of well-known means.

The present invention provides a method controlling cell connection attempts for uplink transmission in the environment where a plurality of terminals belonging to a single cell attempt data transmission simultaneously. The present invention can control the congestion occurring in a cell by allowing a plurality of terminals to decide whether to transmit particular application data depending on the reporting needs of the respective terminals.

In the exemplary system described above, the methods have been described based on flow charts in the form of a series of steps or blocks. However, the present invention is not limited to the order of the steps; rather, some steps can be carried out in a different order with other steps or carried out simultaneously. It should also be understood by those skilled in the art that the steps illustrated in the flow charts are not exclusive and one or more steps of the flow charts can be deleted without affecting the scope of the present invention.

What is claimed is:

1. A method of receiving a message by a terminal in a wireless communication system, comprising:

receiving a message from a base station, wherein the message is a paging message or system information received when the terminal is in an idle state;

determining whether or not to initiate a random access procedure based on the presence of an indicator in the message; and discarding data stored in the terminal for the uplink transmission or data generated for the uplink transmission when the terminal determines not to initiate the random access procedure, wherein the terminal determines not to initiate the random access procedure if the indicator is included in the message, and the terminal determines to initiate the random access procedure if the indicator is not included in the message, wherein the indicator is a stop indicator used for stopping the uplink transmission, wherein the indicator is used for an uplink transmission, and wherein the data is discarded when the indicator is not included in the message.

2. The method of claim 1, further comprising, initiating a random access procedure for the uplink transmission when the terminal determines to initiate the random access procedure; and transmitting uplink data to the base station.

3. The method of claim 1, wherein the random access procedure comprises:

transmitting a random access preamble to the base station; and receiving a random access response from the base station in response to the random access preamble.

4. The method of claim 1, wherein the message includes an identifier of the terminal or a group identifier of the terminal.

5. The method of claim 1, wherein the terminal receives the message in an RRC_IDLE state.

6. The method of claim 1, wherein the message is transmitted on PDCCH (Physical Downlink Control Channel).

7. The method of claim 1, wherein the stop indicator is for delay tolerant data of the uplink transmission.

* * * * *